(12) United States Patent
Ishikawa et al.

(10) Patent No.: US 9,555,972 B2
(45) Date of Patent: Jan. 31, 2017

(54) CONVEYOR BELT AND BELT CONSTITUENT MEMBERS

(71) Applicant: TSUBAKIMOTO CHAIN CO., Osaka-shi, Osaka (JP)

(72) Inventors: Masayuki Ishikawa, Osaka (JP); Hajime Ozaki, Osaka (JP); Katsutoshi Shibayama, Tokyo (JP)

(73) Assignee: TSUBAKIMOTO CHAIN CO., Osaka-shi, Osaka (JP)

( * ) Notice: Subject to any disclaimer, the term of this patent is extended or adjusted under 35 U.S.C. 154(b) by 0 days.

(21) Appl. No.: 14/891,753

(22) PCT Filed: Jun. 28, 2013

(86) PCT No.: PCT/JP2013/067906
§ 371 (c)(1),
(2) Date: Nov. 17, 2015

(87) PCT Pub. No.: WO2014/207926
PCT Pub. Date: Dec. 31, 2014

(65) Prior Publication Data
US 2016/0114980 A1    Apr. 28, 2016

(51) Int. Cl.
*B65G 17/08* (2006.01)
*B65G 17/40* (2006.01)
*B65G 17/24* (2006.01)

(52) U.S. Cl.
CPC ............... *B65G 17/40* (2013.01); *B65G 17/24* (2013.01)

(58) Field of Classification Search
CPC ...................................................... B65G 17/06
(Continued)

(56) References Cited

U.S. PATENT DOCUMENTS 4,394,901 A * 7/1983 Roinestad ............ B65G 17/068
198/850
4,742,907 A   5/1988 Palmaer
(Continued)

FOREIGN PATENT DOCUMENTS

CN    1220228 A    6/1999
CN    1398770 A    2/2003
(Continued)

OTHER PUBLICATIONS

International Preliminary Report on Patentability (Form PCT/IB/373) issued in counterpart International Application No. PCT/JP2013/067906 dated Dec. 29, 2015, with Form PCT/ISA/237. (5 pages).
(Continued)

*Primary Examiner* — Douglas Hess
(74) *Attorney, Agent, or Firm* — Westerman, Hattori, Daniels & Adrian, LLP

(57) ABSTRACT

A conveyor belt (11) is formed by coupling multiple chain links 15 aligned in a conveyance direction X. The chain link (15) is provided with multiple recess parts (15a) and first hinge parts (21) protruding in the conveyance direction X from positions between which each of the recess parts (15a) is placed. If some object hits on an outer end of the conveyor belt (11) to apply force to the first hinge part (21), a section including the first hinge part (21) and a bulging part (30) pivots about a fulcrum at an outer base end of the first hinge part (21) to deform this section. In this invention, a point of action where force acts on the conveyor belt (11) and the center of pivotal motion of the first hinge part (21) and the bulging part (30) are determined to be spaced by a relatively short distance.

8 Claims, 7 Drawing Sheets

(58) Field of Classification Search
USPC .................................. 198/850, 851, 852, 853
See application file for complete search history.

(56) References Cited

U.S. PATENT DOCUMENTS

| | | | | |
|---|---|---|---|---|
| 4,858,751 | A * | 8/1989 | Hodlewsky | B65G 17/08 198/325 |
| 4,893,710 | A * | 1/1990 | Bailey | B65G 17/08 198/853 |
| 5,131,526 | A * | 7/1992 | Kaak | B65G 17/086 198/778 |
| 5,174,439 | A | 12/1992 | Spangler et al. | |
| 5,197,593 | A * | 3/1993 | Funkhouser | B65G 17/08 198/851 |
| 5,247,789 | A * | 9/1993 | Abbestam | B65G 17/08 198/851 |
| 5,335,768 | A * | 8/1994 | Schladweiler | B65G 17/08 198/853 |
| 5,690,210 | A * | 11/1997 | Layne | B65G 17/086 198/853 |
| 5,960,937 | A | 10/1999 | Stebnicki et al. | |
| 6,073,756 | A * | 6/2000 | Damkjær | B65G 17/086 198/850 |
| 6,837,367 | B1 * | 1/2005 | Klein | B65G 17/086 198/852 |
| 7,252,191 | B2 * | 8/2007 | Ozaki | B65G 17/24 198/779 |
| 7,364,038 | B2 * | 4/2008 | Damkjaer | B65G 17/32 198/845 |
| 7,527,143 | B2 * | 5/2009 | Krisl | B65G 17/40 198/779 |
| 7,563,188 | B2 * | 7/2009 | Ozaki | B65G 17/08 198/779 |
| 7,604,111 | B2 * | 10/2009 | Zmaj | B65G 21/22 198/831 |
| 7,802,676 | B2 * | 9/2010 | Guldenfels | B65G 17/08 198/688.1 |
| 8,047,356 | B2 * | 11/2011 | Elsner | B65G 17/086 198/851 |
| 8,162,134 | B2 * | 4/2012 | Krause | B65G 17/08 198/779 |
| 8,356,708 | B2 * | 1/2013 | Andersen | B65G 17/08 198/321 |
| 8,434,613 | B2 * | 5/2013 | Ozaki | B65G 23/18 198/690.1 |
| 8,678,178 | B2 * | 3/2014 | Bickel, Jr. | B65G 17/086 198/778 |
| 8,783,449 | B2 * | 7/2014 | Murakami | B65G 15/30 198/779 |
| 8,844,713 | B2 * | 9/2014 | Lasecki | B65G 17/064 198/851 |
| 8,991,595 | B2 * | 3/2015 | Buter | B65G 17/08 198/853 |
| 9,085,414 | B2 * | 7/2015 | Sharma | B65G 17/086 |
| 9,212,003 | B2 * | 12/2015 | Gabler | B65G 17/086 |
| 2003/0015406 | A1 | 1/2003 | Guldenfels et al. | |
| 2003/0141172 | A1 | 7/2003 | Arai et al. | |
| 2005/0241920 | A1 | 11/2005 | Ozaki et al. | |
| 2006/0237290 | A1 | 10/2006 | Guldenfels et al. | |
| 2006/0237291 | A1 | 10/2006 | Ozaki et al. | |
| 2007/0227861 | A1 | 10/2007 | Stebnicki et al. | |
| 2012/0080290 | A1 | 4/2012 | Fourney | |

FOREIGN PATENT DOCUMENTS

| | | |
|---|---|---|
| CN | 1457314 A | 11/2003 |
| JP | 06-92426 A | 4/1994 |
| JP | 2005-306552 A | 11/2005 |
| JP | 2005-314060 A | 11/2005 |
| JP | 2006-298619 A | 11/2006 |
| JP | 2006-327711 A | 12/2006 |
| JP | 2007-502245 A | 2/2007 |
| JP | 2011-246265 A | 12/2011 |

OTHER PUBLICATIONS

International Search Report dated Sep. 3, 2013, issued in counterpart application No. PCT/JP2013/067906 (2 pages).
Office Action dated May 26, 2016, issued in counterpart Chinese Patent Application No. 201380076308.8. (5 pages).
Office Action dated Aug. 23, 2016, issued in counterpart Japanese Patent Application No. 2015-523804. (3 pages).

* cited by examiner

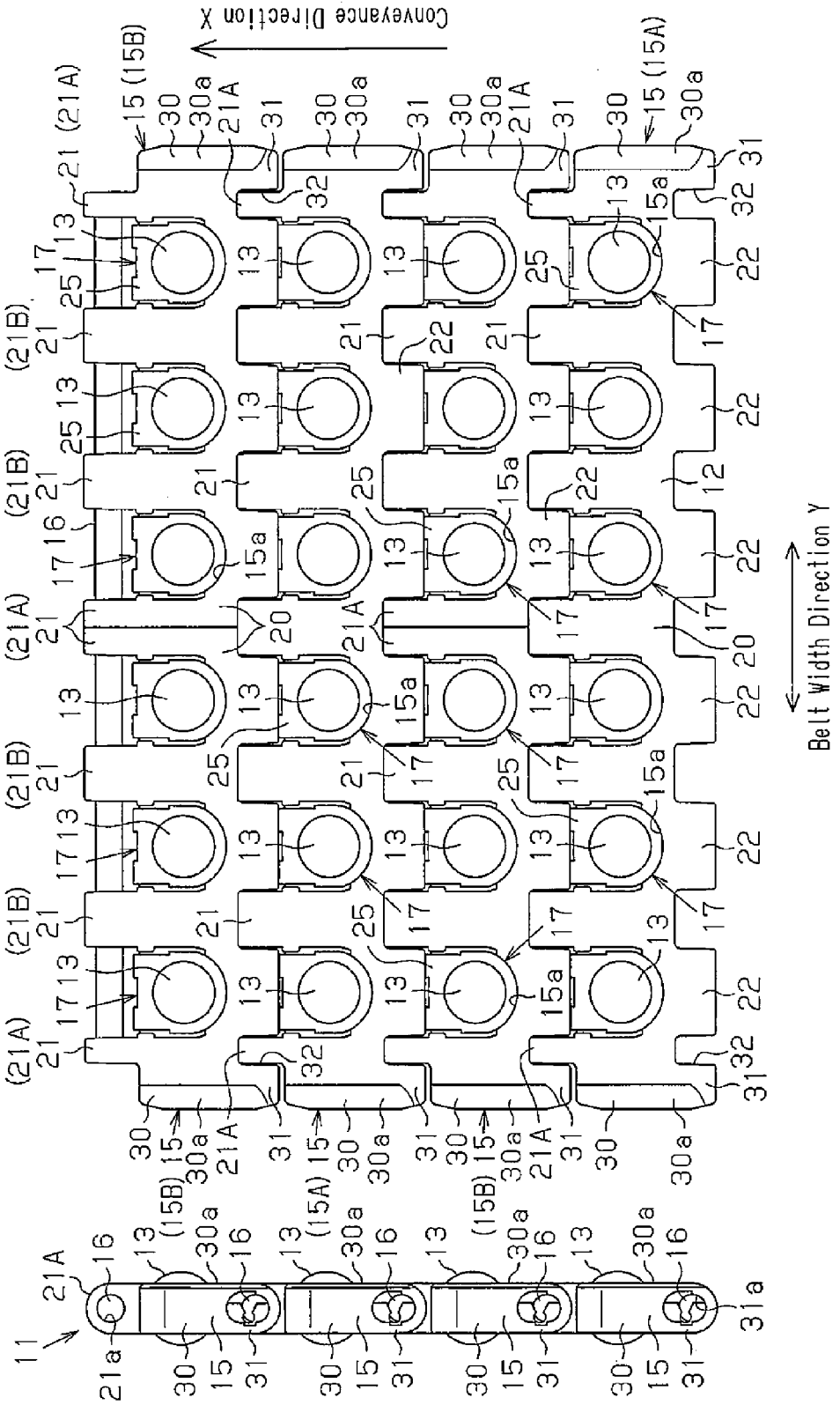

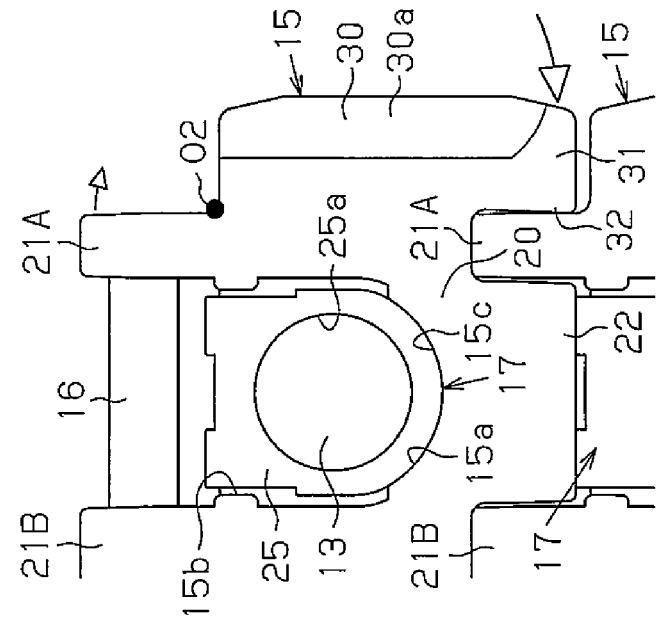
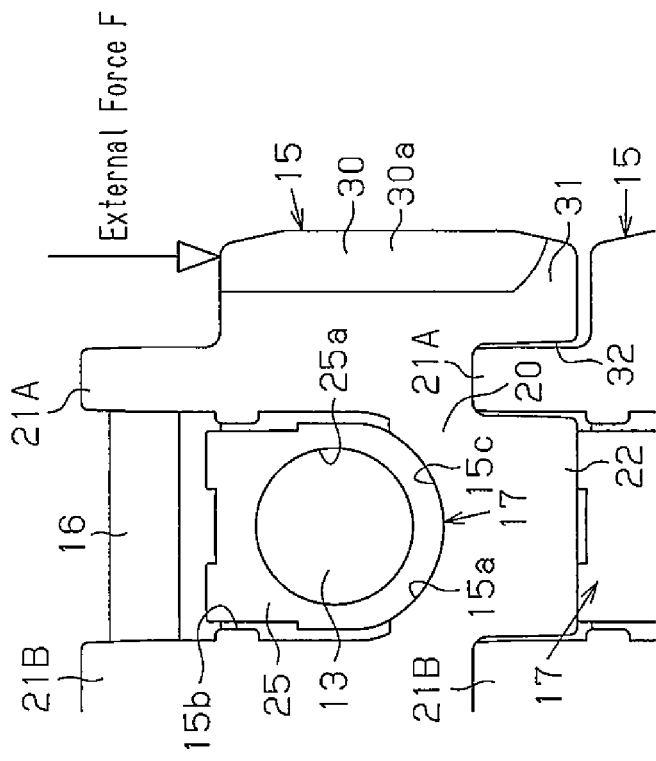

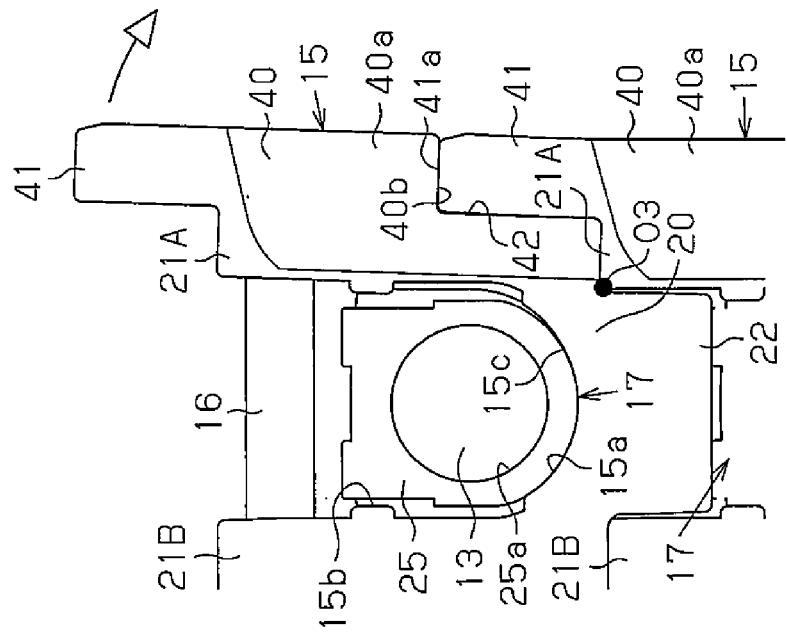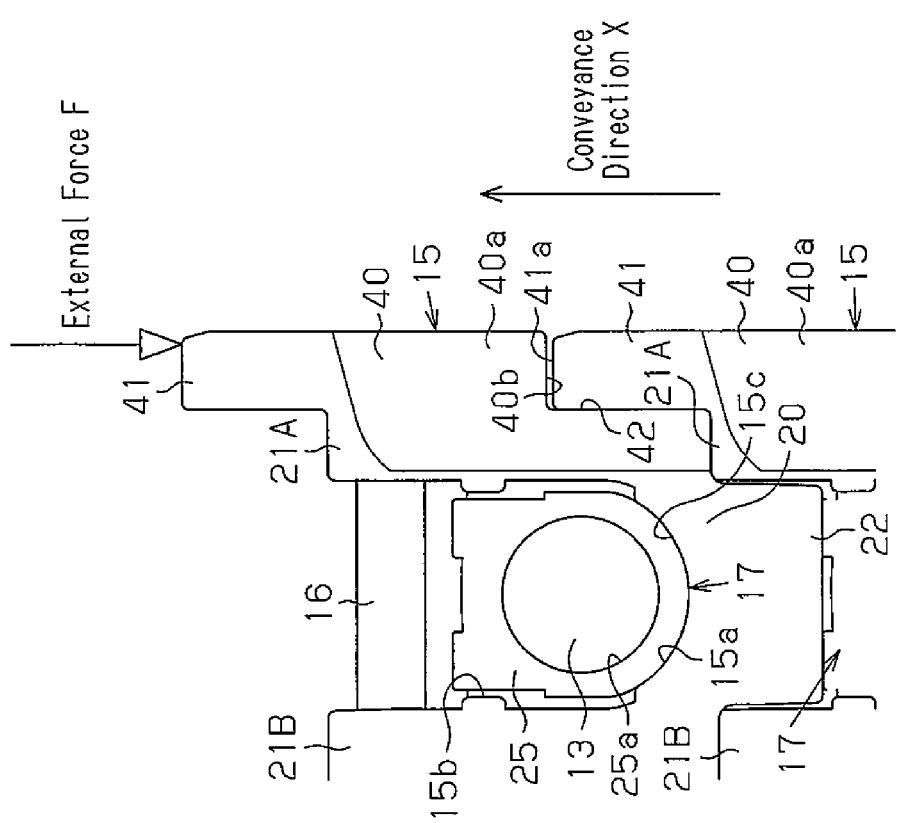

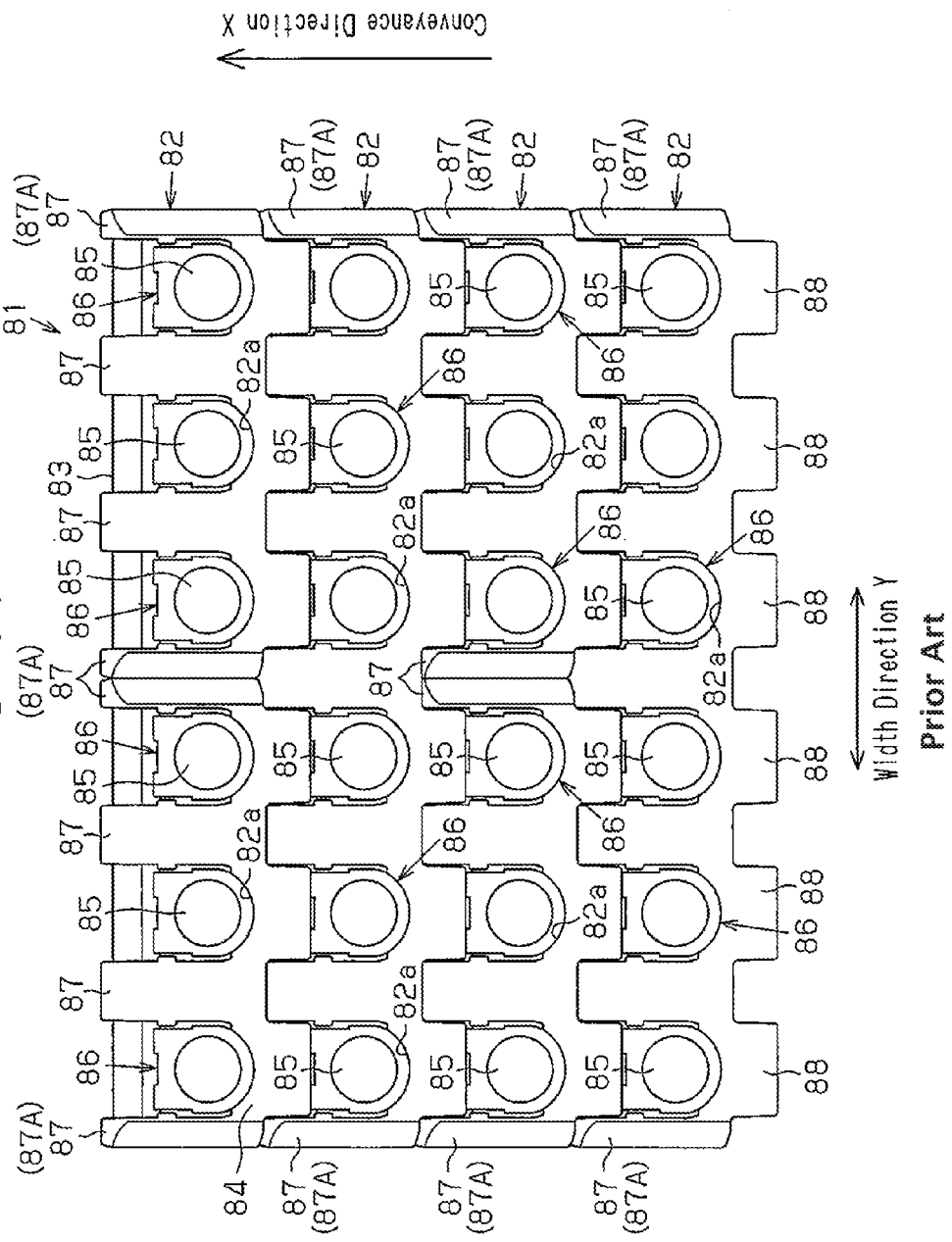

CONVEYOR BELT AND BELT CONSTITUENT MEMBERS

TECHNICAL FIELD OF THE INVENTION

This invention relates to a conveyor belt and belt constituent members.

BACKGROUND OF THE INVENTION

A conveyor belt is used in a belt conveying device to convey an item. A conveyor belt such as a modular belt disclosed in patent documents 1 to 5 includes multiple balls (free balls) arranged in a vertical direction and a horizontal direction. The multiple balls are attached to the conveyor belt while protruding from a surface of the belt.

FIG. 7 shows an example of a conventional conveyor belt with balls. A conveyor belt 81 includes a belt part 84. The belt part 84 is formed of multiple chain links 82 each provided as an example of belt component. The multiple chain links 82 are aligned in the longitudinal direction of the belt parallel to a conveyance direction X. Each chain link 82 is arranged in a manner such that the longitudinal direction of the chain link 82 agrees with a width direction Y crossing the conveyance direction X. The belt part 84 is formed by coupling the multiple chain links 82 through a pin 83 in a manner that allows pivotal motion of the chain links 82. Each chain link 82 is provided with multiple recess parts 82a spaced at substantially constant intervals in the longitudinal direction of the chain link 82. The recess part 82a is formed in a manner such that an opening end of the recess part 82a is pointed toward a downstream side of the conveyance direction X. A ball unit 86 that holds a ball 85 in a manner that allows rotation of the ball 85 is attached to the recess part 82a. For example, a conveying device is formed by placing the conveyor belt 81 with balls on a driving mechanism that controls rotation of the ball 85. This conveying device has the function of conveying an item at double speed and the function of changing a direction of conveyance of an item that are carried out by controlling the rotation of the ball 85 with the driving mechanism.

The chain link 82 has one first hinge part 87 on each of opposite lateral sides of the recess part 82a. Each first hinge part 87 extends in a direction opposite to the direction in which the recess part 82a is recessed, specifically, in the conveyance direction X. The chain link 82 is provided with multiple second hinge parts 88 at its rear edge to be spaced at substantially constant intervals in the longitudinal direction of the chain link 82. Each second hinge part 88 protrudes from a position corresponding to the recess part 82a of the chain link 82.

Two adjacent chain links 82 are attached to each other while the second hinge part 88 is inserted between a pair of first hinge parts 87. The two adjacent chain links 82 are pivotally coupled to each other through the pin 83 inserted in respective pin holes of these chain links 82.

A first hinge part 87 among the multiple first hinge parts 87 placed an end portion of the chain link 82 is narrower than the other first hinge parts 87. This is done with the intention of placing the first hinge parts 87 adjacent to each other in the width direction Y at an interval the same as an interval between the other adjacent first hinge parts 87.

PRIOR ART DOCUMENTS

Patent Documents

Patent Document 1: Japanese Laid-Open Patent Publication No. 2006-298619

Patent Document 2: Japanese Laid-Open Patent Publication No. 2005-306552

Patent Document 3: Japanese Laid-Open Patent Publication No. 2005-314060

Patent Document 4: Japanese Laid-Open Patent Publication No. 2006-327711

Patent Document 5: Japanese Laid-Open Patent Publication No. 2011-246265

DISCLOSURE OF THE INVENTION

While the conveyor belt 81 is moving, an external force applying object to apply some kind of external force may hit on an end portion of the conveyor belt 81. The external force applying object may be an item to be conveyed, a foreign matter on or outside the belt part, a worker, or an object belonging to the worker, for example.

FIGS. 8(a) and 8(b) show a state where an external force applying object hits on an end portion of the conveyor belt 81 in the width direction while the conveyor belt 81 is moving. In this case, external force F is applied to the tip of a first hinge part 87 at the outermost position of the chain link 82 to deform a periphery of this first hinge part 87.

As shown in FIG. 8(a), force is first applied to the tip of the first hinge part 87 from outside to expand the opening of the recess part. Then, as shown in FIG. 8(b), a section including the first hinge part 87 and an outer wall of the recess part 82a pivots about a fulcrum O1 at an outer base end of the second hinge part 88 in an arrow direction of FIG. 8(b), thereby deforming this section. This expands the opening of the recess part 82a, causing the risk of detachment of the pin 83 from the first hinge part 87. This further causes the risk of detachment of the ball unit 86 from the recess part 82a.

The aforementioned problems are generally common to a conveyor belt including a belt component such as a chain link with a recess part that receives a unit member attached to the recess part that is not limited to a ball unit but may be a roller unit, a guide unit, or a scraper unit, for example.

It is an object of this invention to provide a conveyor belt and a belt component with a recess part receiving a unit member attached to the recess part capable of limiting an expansion amount of the recess part to a small amount on the occurrence of application of external force to an end portion of the belt component in the longitudinal direction thereof.

To solve the aforementioned problem, a first aspect of this invention provides a conveyor belt including a belt part and a unit member. The belt part includes multiple belt components. The belt part is formed by coupling adjacent belt components through a hinge part in a manner that allows the adjacent belt components to pivot freely. Each of the belt components is provided with a recess part having an opening pointed in a short-side direction of the belt. The unit member is attached to the recess part of each of the belt components. The hinge part includes multiple first hinge parts and multiple second hinge parts. The first hinge parts protrude from positions between which recess parts of each of the belt components are placed. The second hinge parts protrude toward a side opposite the first hinge parts. A belt component among the multiple belt components placed at an end portion of the belt part in a width direction has an end portion provided with a bulging part that protrudes in the width direction. The bulging part has a restricting part that protrudes in the same direction as the first hinge parts or the second hinge parts. The restricting part faces an end portion of a belt component in the width direction adjacent to the bulging part.

An end portion of the conveyor belt may hit on some external force applying object while the conveyor belt is moving. In this case, the belt component pivots in an area around the portion having hit on the external force applying object in a direction where the recess part is expanded, thereby deforming the belt component. In this regard, in this invention, the restricting part is provided in the bulging part along a short-side direction of the belt component to protrude in the same direction as the first hinge parts or the second hinge parts. Thus, if collision with the external force applying object causes displacement of the bulging part, the restricting part abuts on the end portion of the belt component in the width direction adjacent to the bulging part. This suppresses further deformation of the belt component. This can make it unlikely that the unit member will be detached from the recess part or excessive fatigue will be caused due to the deformation.

In the aforementioned conveyor belt, it is preferred that the restricting part protrude in the same direction as the second hinge parts and the first hinge part of the belt component adjacent to the bulging part is inserted between the restricting part and the second hinge part.

In this structure, if the belt component pivots in an area around a portion having hit on an external force applying object in the direction where the recess part is expanded, the restricting part abuts on the first hinge part. This restricts further deformation of the belt component. In this case, as a result of the presence of the bulging part, the center of pivotal motion of the belt component is set near the first hinge part. This limits the amount of displacement in the direction where the opening of the recess part is expanded to a relatively small amount.

In the aforementioned conveyor belt, it is preferred that the restricting part protrudes further than tips of the first hinge parts in the same direction as the first hinge parts.

An end portion of the conveyor belt may hit on some external force applying object while the conveyor belt is moving. In this case, the belt component pivots in an area around the portion having hit on the external force applying object in the direction where the recess part is expanded, thereby deforming the belt component. At this time, a part of the bulging part abuts on the restricting part of the belt component adjacent to the bulging part. This restricts further pivotal motion of the belt component.

In the aforementioned conveyor belt, it is preferred that the restricting part holds the first hinge part between the restricting part and the second hinge part, the restricting part, the first hinge part, and the second hinge part form the hinge part together, and a common pin passes through the hinge part.

In this structure, the restricting part forms the hinge part. This allows coupling of the belt components while the narrowest first hinge part at the outermost position of the belt component is held between the second hinge part and the restricting part. Thus, the first hinge part at the outermost position having a relatively small width and low strength can be protected.

In the aforementioned conveyor belt, it is preferred that the bulging part has a sloping surface that rises up from a position outside the width direction of the belt part toward a position inside the width direction.

In this structure, as a result of the provision of the bulging part at the end portion of the belt component in the width direction, the end portion of the belt component can be relatively wide. Further, forming the sloping surface of the bulging part that rises up from a position outside the surface of the bulging part toward a position inside the surface can prevent strength reduction that is to be caused by thinning of an area around the recess part. Additionally, a relatively large area of the sloping surface is ensured. This allows an item to be transferred onto the conveyor belt smoothly.

In the aforementioned conveyor belt, it is preferred that the unit member is at least one of a ball unit, a roller unit, a guide unit, and a scraper unit.

At least one of a ball unit and a roller unit may be attached as the unit member to the recess part. In this case, an item on the conveyor belt can be moved by the rolling motion of a ball or a roller at a predetermined speed relative to the moving belt. As an example, the item can be conveyed at a speed twice the speed of movement of the belt. At this time, even if external force is applied to an end portion of the conveyor belt, detachment of the ball unit or the roller unit from the recess part can still be prevented. Additionally, at least one of a guide unit and a scraper unit may also be attached as the unit member to the recess part. In this case, the conveyor belt moves in a direction guided by the unit member, so that the conveyor belt is less likely to travel in a zigzag manner. Further, items can be collected with a scraper.

To solve the aforementioned problem, a second aspect of this invention provides a belt component having one end or opposite ends in a longitudinal direction of the belt component that form the end portion of the belt part in the width direction in the aforementioned conveyor belt. The belt component includes first hinge parts and second hinge parts, and a bulging part provided to either of or both of the one end or the opposite ends of the belt component. The bulging part protrudes in the longitudinal direction of the belt component. The bulging part has a restricting part that protrudes in the same direction as the first hinge parts or the second hinge parts. The restricting part faces an end portion of a belt component in the width direction adjacent to the bulging part.

In this structure, one end or opposite ends of the belt component form the end portion of the conveyor belt in the width direction, thereby obtaining the same advantages as that of the conveyor belt.

BRIEF DESCRIPTION OF DRAWINGS

FIG. 2(a) is a partial side view of the conveyor belt.

FIG. 2(b) is a partial plan view of the conveyor belt.

FIG. 3(a) is a partial plan view showing a state where force is applied to an outer end of a chain link.

FIG. 3(b) is a partial plan view showing a state where the outer end of the chain link is caused to pivot by this force.

FIG. 4(a) is a partial plan view showing a state where force is applied to an outer end of a chain link of a modification.

FIG. 4(b) is a partial plan view showing a state where the outer end of the chain link is caused to pivot by this force.

FIG. 7(a) is a side view of a conventional conveyor belt.

FIG. 7(b) is a plan view of the conveyor belt.

DETAILED DESCRIPTION OF THE PREFERRED EMBODIMENTS

First Embodiment

Figure 1:
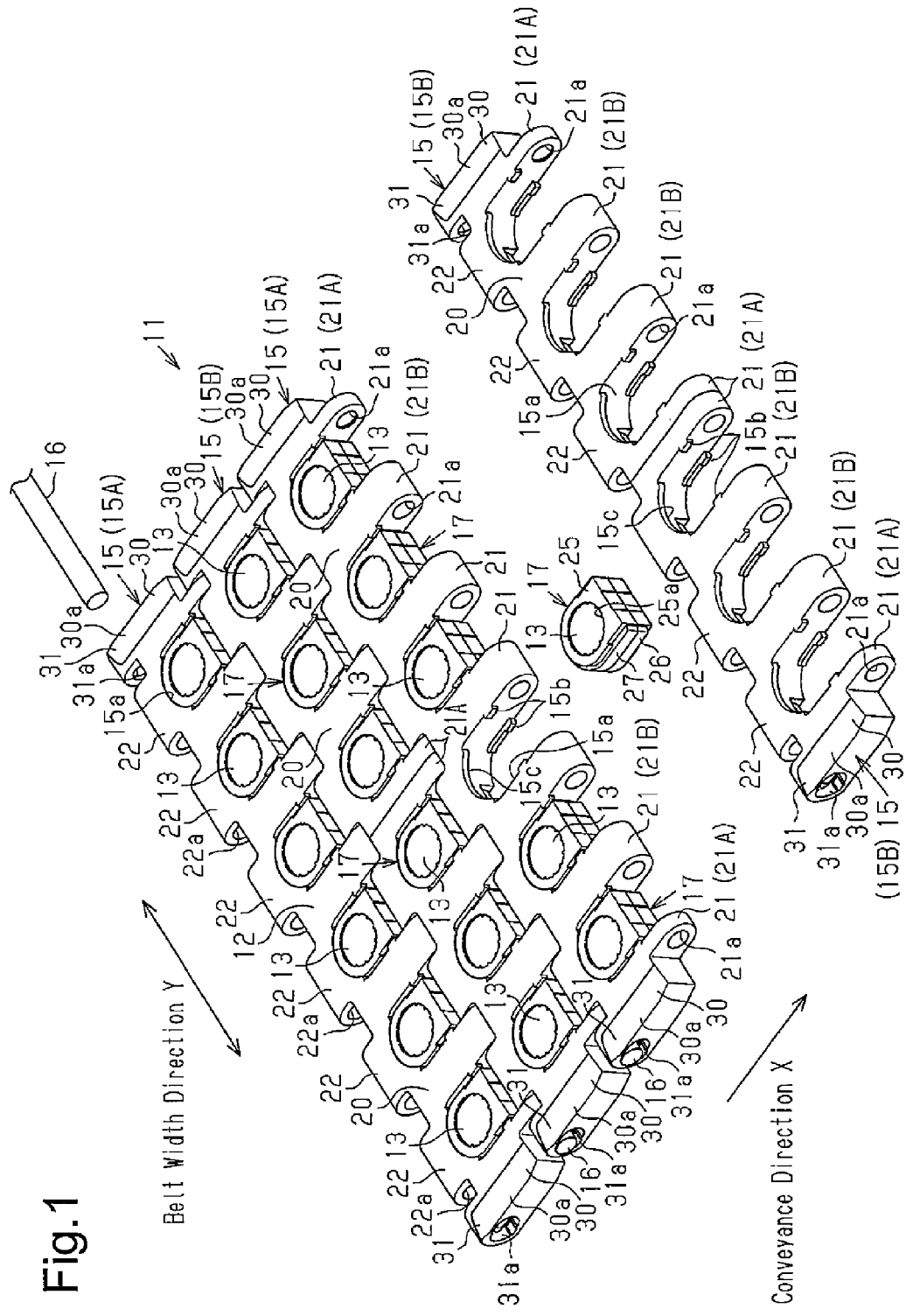
FIG. 1 is an exploded perspective view showing a part of a conveyor belt according to an embodiment of this invention.

A first embodiment of this invention is described below based on FIGS. 1 to 3(b). In the first embodiment, a conveyor belt 11 of this invention is embodied in a conveyor belt with balls. In the following description of the conveyor belt 11, a direction in which an item is conveyed is called a conveyance direction X and a direction crossing the conveyance direction X is called a belt width direction Y. The longitudinal direction of the belt is parallel to the conveyance direction X. FIG. 1 shows only a part of the conveyor belt.

The conveyor belt 11 shown in FIG. 1 is configured as an endless belt with opposite ends (not shown in the drawings) of the conveyor belt 11 in the longitudinal direction of the belt coupled to each other. The conveyor belt 11 is wrapped around multiple sprockets (not shown in the drawings) while the opposite ends of the conveyor belt 11 in the longitudinal direction are in meshing engagement with the corresponding sprockets. When a motor as a power source is driven by a controller not shown in the drawings, a sprocket on a driving side is rotated. This rotates the conveyor belt 11 around the sprockets to convey an item on the conveyor belt 11 in the conveyance direction X. The conveyor belt 11 includes a belt part 12 formed of a modular belt and multiple balls 13 exposed from a surface of the belt part 12. The multiple balls 13 are arranged in a matrix and spaced at substantially constant intervals in a vertical direction and a horizontal direction.

As shown in FIGS. 1, 2(a), and 2(b), the conveyor belt 11 includes multiple chain links 15 each provided as an example of a belt component extending in the belt width direction Y. The multiple chain links 15 are arranged and assembled in a designated layout pattern. The chain links 15 adjacent to each other in the longitudinal direction of the belt are coupled in a manner that allows these chain links 15 to pivot freely, thereby forming the belt part 12 into a shape like a band.

The chain link 15 includes two types of chain links of different lengths: a chain link 15A and a chain link 15B. The chain link 15A is a comparatively long chain link including six recess parts 15a. The chain link 15B is a comparatively short chain link including three recess parts 15a. The recess part 15a of each of the chain links 15A and 15B receives a ball unit 17 attached as an example of a unit member to the recess part 15a. A ball 13 is held in the ball unit 17 in a manner that allows rolling motion of the ball 13. The length of the chain link 15A is twice the length of the short chain link 15B.

The layout pattern of the chain links 15 is as follows. Two chain links 15B are arranged adjacent to one chain link 15A in the conveyance direction X while respective end surfaces of these chain links 15B in their longitudinal directions abut on each other. Specifically, the two chain links 15B are arranged in a manner such that the length of these chain links 15B agrees with the length of one chain link 15A. This layout pattern is formed repeatedly in the longitudinal direction of the belt. The chain links 15 adjacent to each other in the longitudinal direction of the belt are coupled through a pin 16 in a manner that allows these chain links 15 to pivot freely. The length of the pin 16 is substantially the same as the width dimension of the conveyor belt 11. Where appropriate, the length of the chain links 15 to be used, which is determined by the number of the chain links 15 to be aligned in the belt width direction Y and a layout pattern for these chain links 15, can be changed depending on the width dimension of the conveyor belt 11 or required strength of the conveyor belt 11, for example.

Each chain link 15 is provided with multiple recess parts 15a substantially U shaped in a plan view formed on a downstream-side lateral edge of each chain link 15. The multiple recess parts 15a are spaced at constant intervals in the belt width direction Y. Each recess part 15a receives one ball unit 17 attached to the recess part 15a. Each ball unit 17 holds one ball 13 (free ball) in a manner that allows rotation of the ball 13. The ball 13 is exposed from an opening at each of the front surface and the rear surface of the ball unit 17. For use of the conveyor belt 11, an opening end of the recess part 15a is pointed toward the conveyance direction X. Thus, frictional force to be generated between the conveyor belt 11 and an item will not act in a direction where the ball unit 17 is detached from the recess part 15a.

The balls 13 are arranged with the same pitch as the chain links 15 in the conveyance direction X. Further, the balls 13 are arranged with the same pitch as the recess parts 15a in the belt width direction Y. The pitch of the balls 13 in the conveyance direction x and that of the balls 13 in the belt width direction Y are substantially the same and set at a predetermined value in a range from 10 to 60 mm, for example. The predetermined value is set to be smaller than a short-side dimension of the bottom surface of an item to be conveyed. Thus, the item is always placed on the multiple balls 13 while the item is being conveyed.

The conveyor belt 11 is used in a conveying device not shown in the drawings. For example, the conveyor belt 11 is placed on a driving mechanism not shown in the drawings forming the conveying device, specifically, on either of or both of a flat belt and a turn table. In the conveying device, the driving mechanism is controlled by a controller not shown in the drawings to control rotation of the balls 13 incorporated in the conveyor belt 11. This enables conveyance of an item at a double speed and change of a direction of the item (for feed or rotation or both for feed and rotation of the item, for example). The balls 13 may be configured in a manner such that they can protrude and be depressed from the surface of the belt part 12.

The chain link 15 has a substrate part 20 formed like an elongated plate. The substrate part 20 is provided with a first hinge part 21 extending in the conveyance direction X formed on each of opposite sides of the recess part 15a. A gap between the first hinge parts 21 is substantially the same as the opening width of the recess part 15a. The substrate part 20 is further provided with multiple second hinge parts 22 in a rear surface part of the substrate part 20, specifically, on a side opposite the first hinge parts 21. Each of the second hinge parts 22 is provided at a position shifted by a half of the pitch in the belt width direction Y from the first hinge part 21. Further, each of the second hinge parts 22 protrudes in a direction opposite the direction in which the first hinge part 21 protrudes.

The width of the second hinge part 22 is slightly smaller than a gap between the first hinge parts 21 in a pair adjacent to each other, specifically, smaller than the opening width of the recess part 15a. The second hinge part 22 is placed at a position substantially the same as the recess part 15a in the longitudinal direction of the chain link 15. The second hinge part 22 has the same width as the recess part 15a in the longitudinal direction of the chain link 15. The second hinge part 22 has a length that allows coupling to the first hinge part 21 of an adjacent chain link 15.

The first hinge part 21 is provided with a pin hole 21a. The second hinge part 22 is provided with a pin hole 22a. The pin holes 21a and 22a penetrate the first and second hinge parts 21 and 22 respectively in respective directions perpendicular to directions in which the first and second hinge parts 21 and 22 protrude. The first hinge part 21 is inserted into a gap between the counterpart second hinge parts 22 and the second hinge part 22 is inserted into a gap between the counterpart first hinge parts 21 until their respective pin holes 21a and 22a agree with each other. Thus, the pin holes 21a and 22a communicate with each other, and the pin 16 is inserted to pass through these pin holes 21a and 22a. In this way, each of the multiple chain links 15 is coupled to a different adjacent chain link 15 through the hinge parts 21 and the hinge parts 22 in a manner that allows these chain links 15 to pivot freely.

The ball unit 17 is substantially D shaped in a plan view. The ball unit 17 includes a holder 25 having substantially the same thickness as the chain link 15. A circular opening 25a is formed in each of the front surface and the rear surface of the holder 25. The holder 25 is formed of a lower cover 26 and an upper cover 27 of substantially the same shape. With the lower cover 26 and the upper cover 27 connected to each other, a part of the ball 13 is exposed through the opening 25a in each of the lower cover 26 and the upper cover 27. In this state, the ball 13 is held in a manner that allows the ball 13 to rotate 360 degrees freely. The ball unit 17 is attached to the chain link 15 by being caused to slide into the recess part 15a.

An attachment structure of the ball unit 17 to the chain link 15 is described next.

As shown in FIG. 1, the recess part 15a has two inner wall surfaces facing each other and a semicylindrical recessed curved surface. The inner wall surfaces are continuous with corresponding lateral surfaces in a pair facing each other and belonging to the first hinge parts 21 on opposite sides of the recess part 15a. The recessed curved surface is continuous with the two inner wall surfaces at a deep position of the recess part 15a. The inner wall surfaces are each provided with one guide part 15b like a rectangular strip formed on each of an upper end and a lower end of the inner wall surface. The guide part 15b is to guide the holder 25 in a manner such that the holder 25 can slide into the recess part 15a and to engage the holder 25 at a position where the holder 25 is attached. The recess part 15a is provided with a guide part 15c formed of an arcuate protruding strip provided at the upper end of the recessed curved surface of the recess part 15a. The guide part 15c is to abut on the front upper edge of the holder 25 inserted in the recess part 15a to restrict movement of the holder 25 toward the surface of the belt. The ball unit 17 is engaged at an attachment position that is the deepest position in the recess part 15a for the ball unit 17 inserted in the recess part 15a through the opening end of the recess part 15a. In this state, the upper end surface of the holder 25 is substantially flush with the upper surface of the substrate part 20.

As shown in FIGS. 1, 2(a) and 2(b), the width of the first hinge part 21 near each of opposite ends of the chain link 15 is smaller than that of the other first hinge parts 21, more specifically, about half of the width of a first hinge part 21B.

Thus, the first hinge part 21 at each of the opposite ends of the conveyor belt 11 in the width direction is comparatively narrow. Further, two first hinge parts 21A are adjacent to each other in a substantially central area of the conveyor belt 11. Thus, if the multiple chain links 15 are aligned in the belt width direction Y, the width of an area where the two first hinge parts 21A abut on each other becomes substantially the same as the width of the other first hinge parts 21B. As a result, the balls 13 are arranged in the belt width direction Y with a pitch that is constant at any position of the conveyor belt 11. The two first hinge parts 21A in the substantially central area of the conveyor belt 11 abut on each other. Thus, even if external force is applied to these first hinge parts 21A, these first hinge parts 21A are relatively unlikely to be deformed.

A bulging part 30 bulging outwardly is formed at an end portion of the chain link 15 in the belt width direction. The bulging part 30 is formed into a shape like a square pole. In this structure, if external force is applied to the bulging part 30, the bulging part 30 and the first hinge part 21A pivot about a fulcrum O2 at an outer base end of the first hinge part 21A in a direction where the opening of the recess part 15a is expanded, as shown in FIGS. 3(a) and 3(b). This structure prevents direct application of external force F on the tip of the first hinge part 21A while placing the fulcrum O2 when the first hinge part 21A is deformed near the first hinge part 21A. This suppresses deformation of the first hinge part 21A.

As shown in FIGS. 1, 2(a), and 2(b), the bulging part 30 has a restricting part 31 protruding in the same direction as the second hinge part 22. The restricting part 31 is placed at a position spaced by a gap 32 from the second hinge part 22 at the outermost position of the chain link 15. The gap 32 is slightly larger than the width of the first hinge part 21. This allows insertion of the first hinge part 21 in the gap 32.

The restricting part 31 forms a hinge part and has a pin hole 31a. The pin hole 31a is arranged on the same axis as the pin hole 22a of the second hinge part 22. To assemble the conveyor belt 11 using the multiple chain links 15, the first hinge part 21 is inserted first in the gap 32. In this way, the first hinge part 21 is caught between the second hinge part 22 and the restricting part 31. In this state, the pin 16 is inserted to pass through the pin holes 21a, 22a, and 31a. The restricting part 31 is not always required to function as a hinge part. The restricting part 31 may be required only to be spaced by a slight gap from the first hinge part 21 inserted in the gap 32.

The bulging part 30 is substantially the same in thickness as the first hinge part 21 and the substrate part 20. The bulging part 30 is substantially the same as or larger than the first hinge part 21A in width. Thus, if external force is applied to a downstream-side end surface of the bulging part 30 in the conveyance direction X, the bulging part 30 tries to pivot clockwise about the outer base end of the first hinge part 21A as the fulcrum O2. At this time, the restricting part 31 tries to make displacement in a direction where the restricting part 31 approaches the second hinge part 22, specifically, to the left of FIG. 3(b). The restricting part 31 is spaced by a slight gap from the first hinge part 21A of a different chain link 15. Thus, the aforementioned displacement makes the restricting part 31 abut on a lateral surface of this first hinge part 21A.

As shown in FIGS. 1, 2(a), and 2(b), the upper surface of the bulging part 30 is formed as a sloping surface 30a that rises up gradually from a position outside the chain link 15 toward a position inside the chain link 15. The sloping surface 30a facilitates transfer of an item to the conveyor belt 11 from a lateral side of the conveyor belt 11. In the absence of a sloping surface, an item is likely to get snagged on a step at an end portion of a conveyor belt. This makes it difficult to transfer the item onto the conveyor belt smoothly. In this regard, in this embodiment, an item is allowed to move smoothly along the sloping surface 30a when the item is to be transferred to the conveyor belt 11 from a lateral side of the conveyor belt 11.

The action of the aforementioned conveyor belt 11 is described next.

As shown in FIGS. 1, 2(a), and 2(b), the conveyor belt 11 is configured as an endless belt and is wrapped around sprockets while being in meshing engagement with the sprockets. When the motor is driven, the conveyor belt 11 rotates around the sprockets to convey an item on the conveyor belt 11 in the conveyance direction X at a designated speed. After an item is fed from an upstream side or a lateral side of the conveyor belt 11 and then transferred onto the conveyor belt 11, the item is conveyed in the conveyance direction X along the conveyor belt 11.

As shown in FIG. 3(a), an end portion of the conveyor belt 11 in the width direction may hit on an external force applying object such as an item, a peripheral object, or a worker. In this embodiment, the plate-like bulging part 30 is formed at an end portion of the chain link 15 in the longitudinal direction thereof. The bulging part 30 bulges outwardly in the belt width direction Y. This makes the bulging part 30 hit on the external force applying object. At this time, the external force F applied to the bulging part 30 acts from a downstream side toward an upstream side of the conveyance direction X. In response, force to cause pivotal motion about the fulcrum O2 at the outer base end of the first hinge part 21A is applied to the chain link 15, as shown in FIG. 3(b). Specifically, a section including the first hinge part 21A and the bulging part 30 pivots in the clockwise direction of FIG. 3(b) about the fulcrum O2 that also forms a corner area between the first hinge part 21A and the bulging part 30. Meanwhile, as a result of the restricting part 31 abutting on the first hinge part 21A, the pivotal motion of the section including the first hinge part 21A and the bulging part 30 is restricted.

The aforementioned embodiment achieves the following effects.

(1) As a result of the presence of the bulging part 30, direct application of external force on the tip of the first hinge part 21A can be prevented easily. If the external force F is applied to the bulging part 30, the section including the first hinge part 21A and the bulging part 30 pivots about the fulcrum O2 at the outer base end of the first hinge part 21A. In this embodiment, the fulcrum O2 is set at a position near the first hinge part 21A. This limits displacement of the first hinge part 21A in the direction where the opening of the recess part 15a is expanded to a relatively small amount. If the section including the bulging part 30 pivots about the fulcrum O2 at the outer base end of the first hinge part 21A, the restricting part 31 abuts on the first hinge part 21A of a chain link 15 adjacent to the bulging part 30. This restricts further pivotal motion of the section including the bulging part 30. As a result, expansion of the opening of the recess part 15a can be limited to a small amount that is to occur if an end portion of the conveyor belt 11 in the width direction hits on an external force applying object.

(2) The restricting part 31 protrudes in the same direction as the second hinge part 22. Thus, the bulging part 30 does not protrude further than the first hinge part 21 at any position in the conveyance direction X. Specifically, the bulging part 30 is shifted toward an upstream side of the conveyance direction X by the length of the protrusion of the first hinge part 21A. In a structure where a restricting part protrudes in the same direction as a first hinge part, for example, the restricting part protrudes from an arcuate surface of a conveyor belt wrapped around sprockets. By contrast, this embodiment can prevent the restricting part 31 from protruding from the arcuate surface of the conveyor belt 11.

(3) The restricting part 31 further functions as a hinge part. Thus, while the first hinge part 21A is held by the second hinge part 22 and the restricting part 31 between one chain link 15 and an adjacent chain link 15 on an upstream side, these chain links 15 can be coupled with the common pin 16. In this way, the restricting part 31 functions to protect the first hinge part 21A having a relatively small width and low strength.

(4) The upper surface of the bulging part 30 is formed as the sloping surface 30a that rises up from a position outside the belt width direction Y toward a position inside the belt width direction Y. This can form the upper surface, specifically, the sloping surface 30a of the bulging part 30 in a relatively large area. Thus, an item can be transferred to the conveyor belt 11 easily from a lateral side of the conveyor belt 11.

(5) The ball unit 17 where the ball 13 is held is attached to the recess part 15a of the chain link 15. An item on the conveyor belt 11 is placed on the ball 13 that rolls. Thus, the item can be conveyed at a speed higher than a speed of movement of the belt part 12 such as a speed twice the speed of movement of the belt part 12, for example. By controlling rotation of the ball 13, the direction of the item can be changed while the item is stopped or being moved.

Second Embodiment

A conveyor belt of a second embodiment is described next by referring to FIGS. 4(a) and 4(b).

In the first embodiment, the restricting part 31 protrudes in the same direction as the second hinge part 22. In the second embodiment, a restricting part 41 protrudes in the same direction as the first hinge part 21A.

As shown in FIGS. 4(a) and 4(b), a bulging part 40 is formed at an end portion of the conveyor belt 11 in the width direction. The bulging part 40 is formed at a lateral portion of the first hinge part 21A. The bulging part 40 is provided with a restricting part 41 protruding in the conveyance direction X. The restricting part 41 protrudes further than the tip of the first hinge part 21A toward a downstream side. The bulging part 40 is provided with a rectangular cutout 42 opened toward an upstream side. The cutout 42 receives the restricting part 41 of the chain link 15 adjacent to the bulging part 40. The bulging part 40 has an end surface 40b spaced by a slight gap from an apical surface 41a of the restricting part 41.

An end portion of the conveyor belt 11 in the width direction may hit on some external force applying object. In this case, the external force F is applied to the tip of the restricting part 41 at the outermost position of the chain link 15. Then, a section including the first hinge part 21A and the bulging part 40 pivots in the clockwise direction of FIG. 4(b) about a fulcrum O3 at an outer base end of the first hinge part 21A. In this case, the fulcrum O3 is set at a relatively narrow portion of the substrate part 20, specifically, at a corner area of a recess part.

However, if the section including the first hinge part 21A and the bulging part 40 pivots slightly, the end surface 40b of the bulging part 40 abuts on the restricting part 41 of the chain link 15 adjacent to the bulging part 40. This restricts further pivotal motion of the bulging part 40. Thus, even if the external force F is applied to an end portion of the belt part 12 in the width direction, deformation of the first hinge part 21A in the direction where the opening of the recess part 15a is expanded is limited to a relatively small amount. This prevents detachment of the pin 16 or shift of the ball unit 17 from its attachment position. This can also effectively suppress fatigue of a portion where stress is applied intensively.

The aforementioned embodiments can be changed as follows.

Figure 5A:
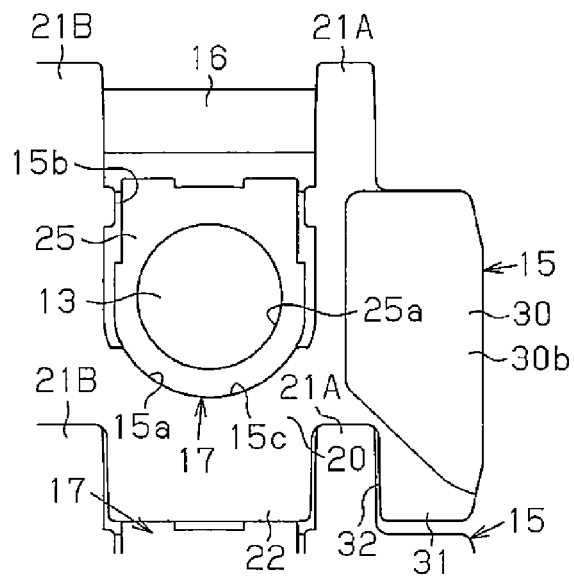
FIG. 5(a) is a partial plan view of a chain link of a modification.
Figure 5B:
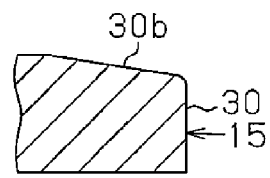
FIG. 5(b) is a side sectional view of a bulging part.

In the first embodiment, the width of the sloping surface 30a of the bulging part 30 is substantially the same as that in the conventional structure shown in FIGS. 7(a) to 8(b). Alternatively, as shown in FIGS. 5(a) and 5(b), the width of a sloping surface 30b may be larger than the width shown in FIG. 3(a). In this case, with the substantially same slope of the sloping surface 30b, the sloping surface 30b at an end portion of the bulging part 30 is placed at an even lower position. This increases a distance between the position of the ball 13 and that of an end portion of the chain link 15 in the longitudinal direction, specifically, a distance between the ball 13 and an end portion of the conveyor belt 11 in the width direction by the increase in the width dimension of the bulging part 30. Additionally, if an item is to be transferred to the conveyor belt 11 from a lateral side of the conveyor belt 11, the item can be conveyed along the sloping surface 30b to a position near the ball 13. Thus, the item can be transferred onto the conveyor belt 11 smoothly.

Figure 6A:
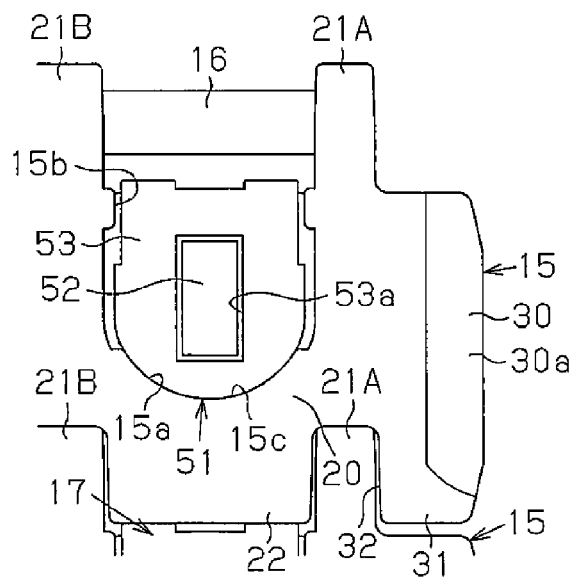
FIG. 6(a) is a partial plan view of a chain link of a modification.

The unit member may be a unit other than the ball unit 17. As shown in FIG. 6(a), the unit member may be a roller unit 51 with a roller, for example. In this structure, the roller unit 51 is attached to the recess part 15a of the chain link 15. The roller unit 51 includes a holder 53 having an opening 53a and a roller 52 housed in the holder 53. The roller 52 can be exposed partially from each of the upper surface and the lower surface of the holder 53 through the opening 53a. The orientation of the roller 52 can be changed, where appropriate. Roller units 51 of different types including the rollers 52 in respective orientations may be attached to the conveyor belt 11, for example. This structure may further include a selecting mechanism that can select between protrusion and depression of the rollers 52. The selecting mechanism may include multiple lifting members with which rollers 52 in the same orientation can be lifted from the belt part 12. By moving up and down the lifting members, the orientations of the rollers 52 to protrude can be selected. In this case, a direction where an item is to be conveyed can be changed depending on the orientations of the rollers 52 having been placed in their protruding positions.

Figure 6B:
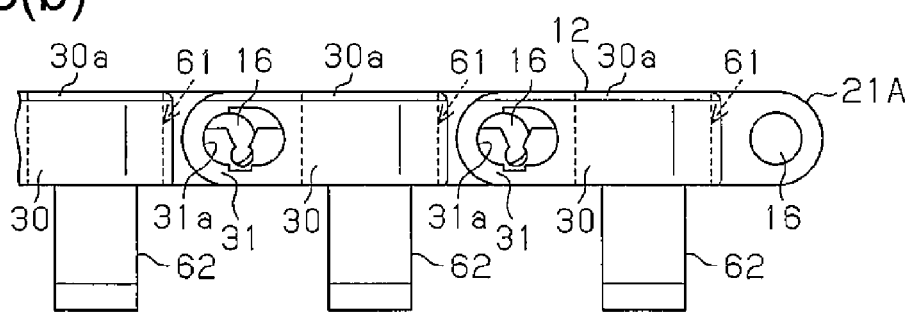
FIG. 6(b) is a side view showing a conveyor belt of a different modification.
Figure 8A:
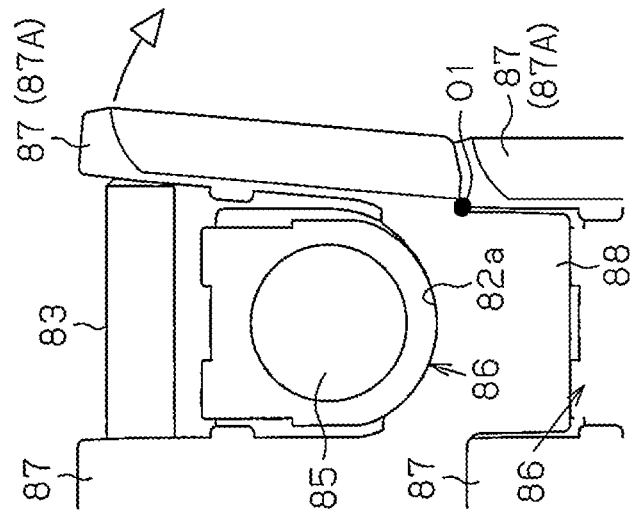
FIG. 8(a) is a partial plan view showing a state where force is applied to an outer end of a conventional chain link.
Figure 8B:
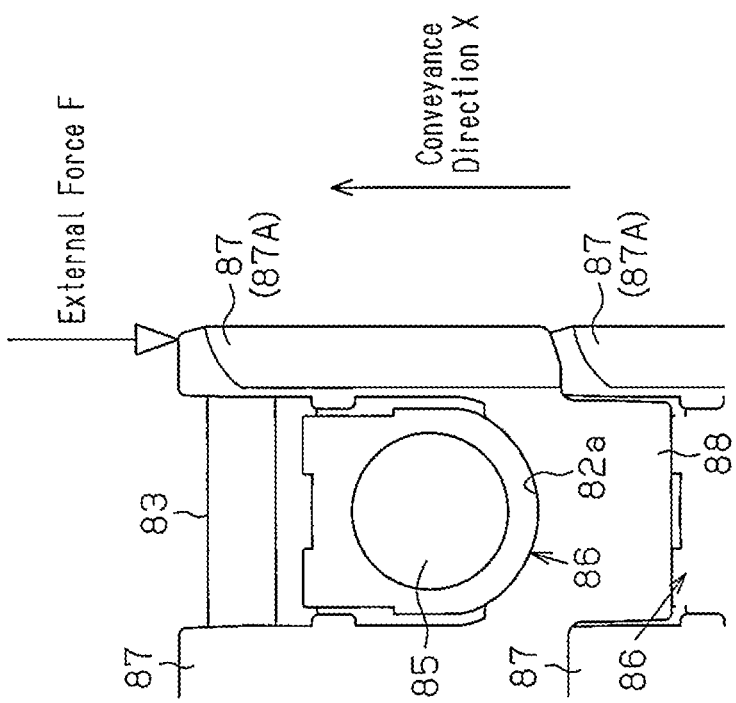
FIG. 8(b) is a partial plan view showing a state where the chain link is caused to pivot by this force.

As shown in FIG. 6(b), the unit member may be a guide unit 61. The guide unit 61 is attached to the recess parts 15a of the chain links 15. The chain links 15 are pivotally coupled to each other through the pin 16 passing through the respective pin holes in the first and second hinge parts 21 and 22. The guide unit 61 is attached to the chain links 15 while L-shaped guide parts 62 are provided to extend downward from the rear surface of the belt part 12. A guide rail not shown in the drawings is provided in a section where the conveyor belt 11 is to be supported. On the other hand, the guide parts 62 are arranged on opposite ends of the conveyor belt 11 in the width direction. Thus, with the guide parts 62 engaged with the guide rail, the conveyor belt 11 is less likely to travel in a zigzag manner.

The unit member may be a scraper unit with a scraper. In this structure, items can be collected and conveyed.

The unit member may be attached to the recess part of the chain link 15 from a direction perpendicular to the front surface or the rear surface of the belt part 12.

This invention is applicable to a belt conveying device in which an item is conveyed by moving a band-like conveyor belt having opposite ends back and forth in the longitudinal direction of the belt. In this case, the conveyor belt may be wound or fed on opposite sides of the conveyor belt in the longitudinal direction thereof.

REFERENCE SIGNS LIST

11 . . . Conveyor belt with ball
12 . . . Belt part
13 . . . ball
15 . . . Chain link as example of belt component
15a . . . Recess part
17 . . . Ball unit as example of unit member
21, 21A . . . First hinge part
22 . . . Second hinge part
30, 40 . . . Bulging part
31, 41 . . . Restricting part

The invention claimed is:

1. A conveyor belt comprising a belt part and a unit member, the belt part including multiple belt components, wherein
the belt part is formed by coupling adjacent belt components through a hinge part in a manner that allows the adjacent belt components to pivot freely,
each of the belt components is provided with a recess part having an opening pointed in a conveyance direction of the belt,
the unit member is attached to the recess part of each of the belt components,
the hinge part includes multiple first hinge parts and multiple second hinge parts, the first hinge parts protruding from positions between which recess parts of each of the belt components are placed, the second hinge parts protruding toward a side opposite the first hinge parts,
a belt component among the multiple belt components placed at an end portion of the belt part in a width direction has an end portion provided with a bulging part that protrudes in the width direction,
the bulging part has a restricting part that protrudes in the same direction as the first hinge parts or the second hinge parts, and
the restricting part faces an end portion of an end-most belt component in the width direction adjacent to the bulging part, said restricting part over-lapping the recess part in the end-most belt component in said conveyance direction.

2. The conveyor belt according to claim 1, wherein
the restricting part protrudes in the same direction as the second hinge parts, and
a first hinge part of the belt component adjacent to the bulging part is inserted between the restricting part and a second hinge part.

3. The conveyor belt according to claim 1, wherein the restricting part protrudes further than tips of the first hinge parts in the same direction as the first hinge parts.

4. The conveyor belt according to claim 2, wherein
the restricting part holds the first hinge part between the restricting part and the second hinge part,
the restricting part, the first hinge part, and the second hinge part form the hinge part together, and
a common pin passes through the hinge part.

5. The conveyor belt according to claim 1, wherein the bulging part has a sloping surface that rises up from a position outside the width direction of the belt part toward a position inside the width direction of the belt part.

6. The conveyor belt according to claim 1, wherein the unit member is at least one of a ball unit, a roller unit, a guide unit, and a scraper unit.

7. A belt component having one end or opposite ends in a longitudinal direction of the belt component that form the end portion of the belt part in the width direction in the conveyor belt according to claim 1,
the belt component comprising:
the first hinge parts and the second hinge parts; and
a bulging part provided to either of or both of the one end or the opposite ends of the belt component, the bulging part protruding in the longitudinal direction of the belt component, wherein
the bulging part has a restricting part that protrudes in the same direction as the first hinge parts or the second hinge parts, and
the restricting part faces an end portion of a belt component in the width direction adjacent to the bulging part.

8. A conveyor belt comprising a belt part and a unit member, the belt part including multiple belt components, wherein
the belt part is formed by coupling adjacent belt components through a hinge part in a manner that allows the adjacent belt components to pivot freely,
each of the belt components is provided with a recess part having an opening pointed in a conveyance direction of the belt,
the unit member is attached to the recess part of each of the belt components,
the hinge part includes multiple first hinge parts and multiple second hinge parts, the first hinge parts protruding from positions between which recess parts of each of the belt components are placed, the second hinge parts protruding toward a side opposite the first hinge parts,
a belt component among the multiple belt components placed at an end portion of the belt part in a width direction has an end portion provided with a bulging part that protrudes in the width direction from an end-most one of said first hinge parts,
the bulging part has a restricting part that protrudes in the same direction as the first hinge parts or the second hinge parts, said restricting part including a stepped portion with an inside wall located laterally further outside of an outside wall of the end-most one of said first hinge parts in the width direction; and
the restricting part faces an end portion of a belt component in the width direction adjacent to the bulging part.

* * * * *